(12) United States Patent
Lee et al.

(10) Patent No.: US 8,776,962 B2
(45) Date of Patent: Jul. 15, 2014

(54) ELECTROMAGNETIC SUSPENSION SYSTEM

(75) Inventors: Tomoyuki Lee, Yokohama (JP);
Noriyuki Utsumi, Tokyo (JP); Hiroshi Yoshikura, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 75 days.

(21) Appl. No.: 13/558,743

(22) Filed: Jul. 26, 2012

(65) Prior Publication Data
US 2013/0025986 A1 Jan. 31, 2013

(30) Foreign Application Priority Data

Jul. 28, 2011 (JP) .................................. 2011-165613

(51) Int. Cl.
*F16F 15/03* (2006.01)
(52) U.S. Cl.
USPC .................. 188/267; 188/322.22; 310/12.04; 29/596
(58) Field of Classification Search
USPC .................. 188/267, 322.17, 322.18, 322.22, 188/321.11; 310/12.01, 12.02, 12.14, 13, 310/14; 29/596, 598
See application file for complete search history.

(56) References Cited

U.S. PATENT DOCUMENTS 6,787,944 B2 * 9/2004 Finkbeiner et al. ........ 310/12.24
2004/0263001 A1 12/2004 Yamanaka

FOREIGN PATENT DOCUMENTS

| JP | 2002-291220 | * 10/2002 |
| JP | 2005-020903 | 1/2005 |
| JP | 2007-321863 | 12/2007 |
| JP | 4538771 | 9/2010 |

* cited by examiner

*Primary Examiner* — Pamela Rodriguez
(74) *Attorney, Agent, or Firm* — Wenderoth, Lind & Ponack, LLP

(57) ABSTRACT

An electromagnetic suspension system uses a linear motor having coils disposed around the outer periphery of a stator and permanent magnets disposed along the inner periphery of a mover. Wiring is routed through a gap between a first rod and a second rod. Thus, contact between the wiring and the second rod is avoided, and the wiring is protected. Consequently, it is possible to ensure reliability for the electric system of the electromagnetic suspension system.

10 Claims, 5 Drawing Sheets

ELECTROMAGNETIC SUSPENSION SYSTEM

BACKGROUND OF THE INVENTION

The present invention relates to an electromagnetic suspension system using a linear motor.

There is publicly known an electromagnetic suspension system as disclosed, for example, in Japanese Patent No. 4538771. The known electromagnetic suspension system uses a linear motor comprising a sliding support structure including a longitudinal member and an outer tube member, in which the gap (air gap) between the permanent magnets of the linear motor and the outer tube member is reduced to improve vibration suppressing performance.

Japanese Patent Application Publication No. 2005-20903 discloses a moving-magnet linear motor using a coil wiring member made of an electrically non-conducting material in the shape of a trough, the top of which is open, to improve the operability of wiring.

Japanese Patent Application Publication No. 2007-321863 discloses a damping force control type shock absorber comprising a wiring structure in which lead wires for supplying electric current to an electric motor-driven actuator is routed through a hollow piston rod.

In the field of electromagnetic suspension systems, it has been studied to use a cylindrical linear motor having magnets (permanent magnets) disposed around the outer periphery of an armature. It is required when using such a cylindrical linear motor to ensure reliability of wiring for the armature and ease to relay and route the armature wiring. In this regard, however, all the above-described three patent literatures are concerned with a cylindrical linear motor having an armature disposed around the outer periphery of a set of magnets (permanent magnets). None of the three patent literatures make mention of wiring for a cylindrical linear motor having magnets (permanent magnets) around the outer periphery of an armature.

SUMMARY OF THE INVENTION

The present invention has been made in view of the above-described circumstances.

Accordingly, an object of the present invention is to provide an electromagnetic suspension system improved in reliability of wiring of a cylindrical linear motor.

To solve the above-described problem, the present invention provides an electromagnetic suspension system including an outer tube in the shape of a cylinder, one end of which is closed. The outer tube has a magnet at the inner periphery thereof. The electromagnetic suspension system further includes a hollow first rod movably inserted in the outer tube. One end of the first rod extends out of the outer tube. The first rod has an armature around the outer periphery of the other end thereof. Further, the electromagnetic suspension system includes a second rod having one end slidably fitted to the inner periphery of the first rod. The other end of the second rod is secured to the bottom of the outer tube. A gap is formed between the inner periphery of the one end of the first rod and the outer periphery of the second rod. The gap accommodates wiring connected at one end thereof to the armature. The other end of the wiring extends to the outside of the first rod.

DETAILED DESCRIPTION OF THE EMBODIMENTS

Embodiments of the present invention will be explained below with reference to the accompanying drawings.

Figure 1:
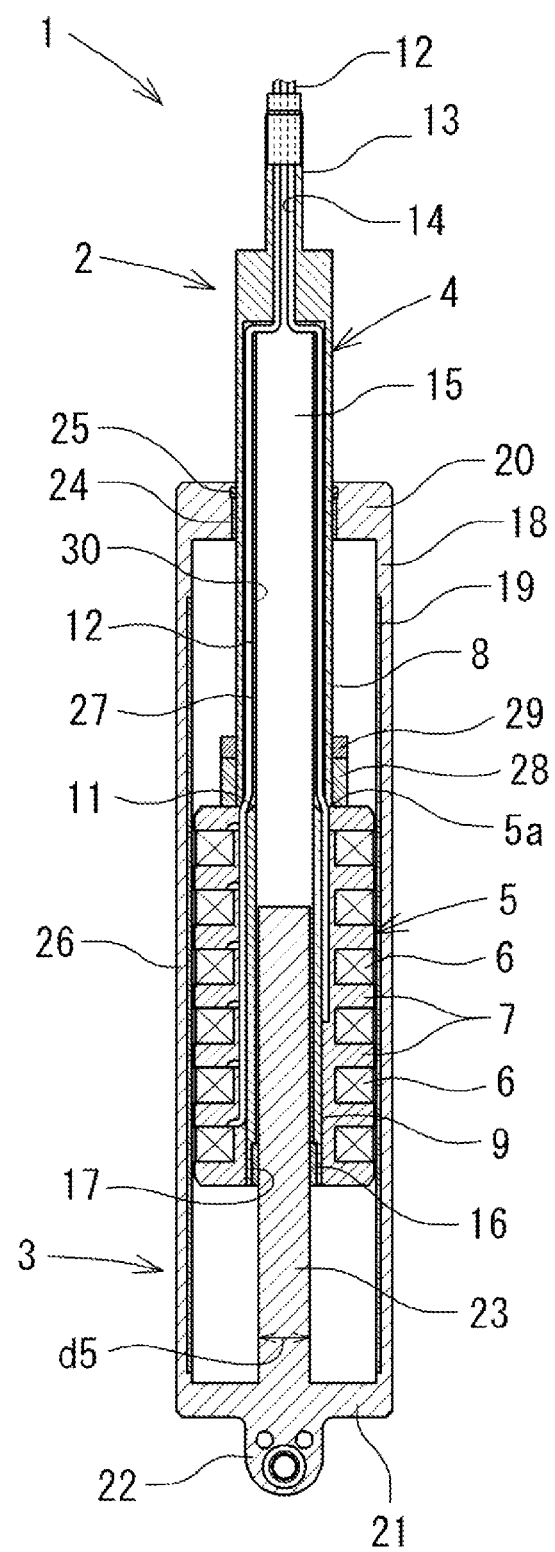
FIG. 1 is an axial sectional view showing an overall structure of a cylindrical linear motor used in an electromagnetic suspension system according to a first embodiment of the present invention.

A first embodiment of the present invention will be explained with reference to FIGS. 1 and 2. It should be noted that the terms "upward (upper)" and "downward (lower)" as used in the following description mean "upward (upper)" and "downward (lower)", respectively, when the reference numerals in FIG. 1 are viewed as erect. FIG. 1 is an axial sectional view showing an overall structure of a cylindrical linear motor used in an electromagnetic suspension system 1 according to the first embodiment. As shown in FIG. 1, the linear motor comprises a stator 2 secured to a sprung member of a vehicle, and a mover 3 secured to an unsprung member of the vehicle.

The stator 2 includes a cylindrical first rod 4 and an armature 5 provided at the lower end (other end) of the first rod 4. The armature 5 has a plurality of coils 6 (stator windings) and a core 7 (stator core) made of a magnetic material and disposed between each pair of adjacent coils 6. It should be noted that, although the linear motor in the first embodiment has six coils 6, the number of coils 6 used in the present invention may be three, nine, or twelve, for example. Wire connection between the coils 6 is made by properly using a publicly-known technique, e.g. star connection. Similarly, the core 7 may be provided with projections for protecting the coils 6 or provided with curved portions for reducing pulsations including cogging torque.

Figure 2:
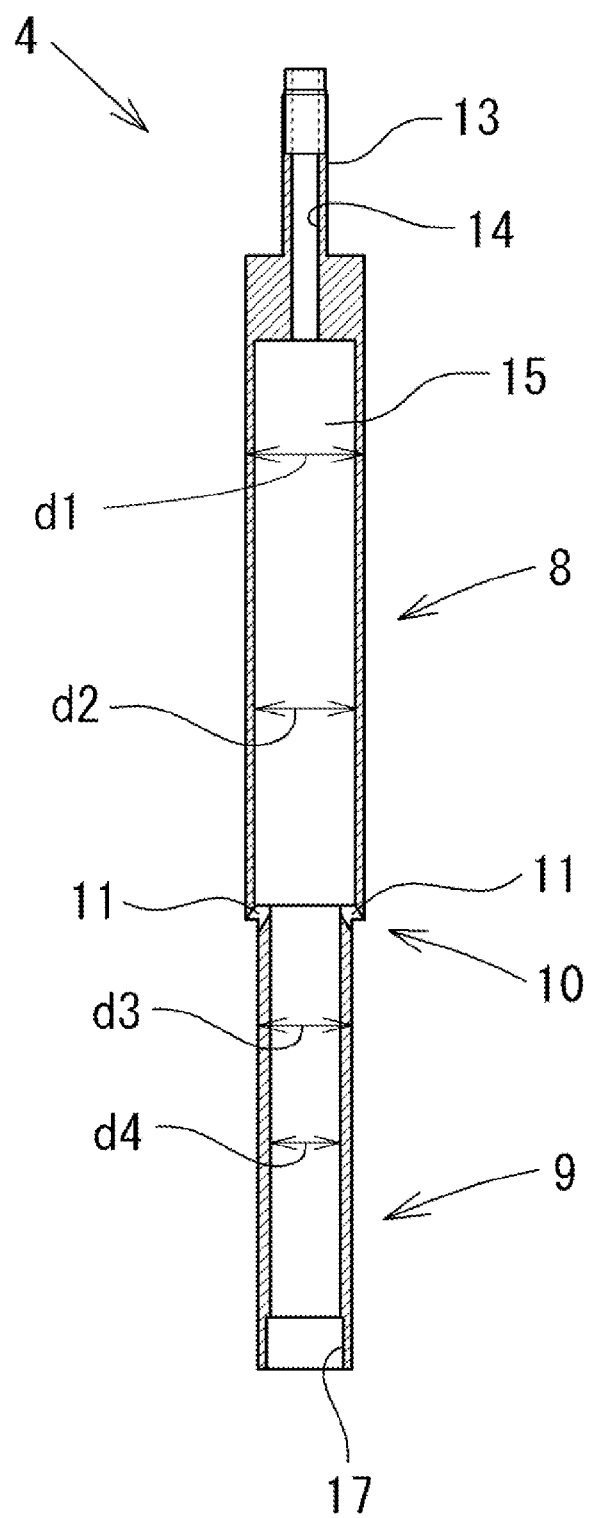
FIG. 2 is an axial sectional view of a first rod used in the linear motor shown in FIG. 1.

As shown also in FIG. 2, the first rod 4 has a large-diameter portion 8 constituting an upper end (one end) portion, and a small-diameter portion 9 constituting a lower end (other end) portion. A stepped portion 10 is formed at the boundary between the large-diameter portion 8 and the small-diameter portion 9. The first rod 4 is provided with at least one wiring hole 11 extending through the stepped portion 10 obliquely (for example, at an angle of 45 degrees with respect to the axis). The wiring hole 11 is used to pass armature wiring 12 (hereinafter referred to as "wires 12") from the outer periphery of the small-diameter portion 9 of the first rod 4 to the inner periphery of the large-diameter portion 8 of the first rod 4. One or a plurality of wiring holes 11 may be provided on the condition that the rigidity required for the first rod 4 can be ensured.

The first rod 4 has a mounting shaft 13 stood on an upper end surface of the large-diameter portion 8 to secure the stator 2 to a vehicle body-side member of the vehicle. The first rod 4 further has a wiring passage 14 extending through the mounting shaft 13 in the axial direction (vertical direction in FIGS. 1 and 2) to communicate between the outside and a space 15 in the first rod 4. The wiring passage 14 accommodates the wires 12 passed to the inner periphery of the large-diameter portion 8 through the wiring hole or holes 11. In addition, as shown in FIG. 2, the first rod 4 has a bearing fitting portion 17 formed on the inner periphery of a lower end portion thereof. A first bearing 16 (see FIG. 1) is fitted into the bearing fitting portion 17. The first rod 4 of the linear motor in the first embodiment is set to satisfy the relation of $d1>d2>d3>d4$, where $d1$ and $d2$ are the outer and inner diameters, respectively, of the large-diameter portion 8, and $d3$ and $d4$ are the outer and inner diameters, respectively, of the small-diameter portion 9. The present invention, however, is not limited to the above-described structure. For example, the respective outer diameters of the large-diameter portion 8 and the small-diameter portion 9 may be set equal to each other, i.e. $d1=d3$.

The mover 3 includes an outer tube 18 in the shape of a cylinder, one end of which is closed. The outer tube 18 is made of a magnetic material. The mover 3 further includes a plurality of permanent magnets 19 secured to the inner periphery of the outer tube 18. The permanent magnets 19 are arranged with alternating polarity in the axial direction at a regular spacing slightly larger or smaller than the spacing of the coils 6. Further, the mover 3 includes an annular bearing mounting part 20 closing the upper end opening of the outer tube 18. The outer tube 18 is provided with a bracket 22 on the outer side of a bottom 21 of the outer tube 18. The bracket 22 is secured to a wheel-side member of the vehicle. Further, the outer tube 18 has a second rod 23. The second rod 23 is coaxially disposed at the inner peripheral side of the outer tube 18, and the lower end of the second rod 23 is secured to the inner side of the bottom 21. The first bearing 16 fitted to the lower end of the first rod 4 is brought into slidable contact with the outer peripheral surface of the second rod 23 inserted into the space 15 in the first rod 4. In addition, a second bearing 24 fitted to the inner periphery of the bearing mounting part 20 is brought into slidable contact with the upper end (one end) portion of the first rod 4, i.e. the outer peripheral surface of the large-diameter portion 8. With the linear motor having the above-described structure, the stator 2 and the mover 3 are movable relative to each other in the axial direction and also in the direction of rotation around the axis.

It should be noted that an annular seal member 25 is provided between the upper end inner peripheral edge of the bearing mounting part 20 and the upper end surface of the second bearing 24. The seal member 25 blocks external entry of water and contamination into the area of sliding contact between the first rod 4 and the second bearing 24. Securing of the second rod 23 to the bottom 21 of the outer tube 18 may be made by properly selecting a joining method using a screw or a bolt, caulking, and so forth.

Each permanent magnet 19 is formed in an annular shape. The permanent magnets 19 are disposed along the inner periphery of a yoke 26 constituting a side wall of the outer tube 18. The permanent magnets 19 are arranged such that each circumferential magnetic pole has the same polarity, i.e. either south pole or north pole, throughout the circumference, and magnetic poles that are adjacent to each other in the axial direction (vertical direction in FIG. 1) are unlike poles. It should be noted that the permanent magnets 19 may be selected from annular and segment (C-type) magnets in view of operability when securing the permanent magnets 19 to the yoke 26, cost, and so forth. Regarding the direction of magnetization of the permanent magnets 19, either of the radial and axial directions may be selected appropriately according to need. The external dimensions of the permanent magnets 19, such as thickness, width, etc., may be determined in view of the combination with the coils 6 of the armature 5, leakage of magnetism to the outside, and so forth.

At the armature 5 side (inner peripheral side), the magnetic flux (lines of magnetic force) exiting from a permanent magnet 19 forms a magnetic path (path of magnetic force lines) that extends from the permanent magnet 19 (north pole) through the core 7 to the permanent magnet 19 (south pole). At the opposite side (outer peripheral side) to the armature 5, the magnetic flux forms a magnetic path that extends from the permanent magnet 19 (north pole) through the yoke 26 to the permanent magnet 19 (south pole). The magnetic flux exiting from the permanent magnet 19 disposed at the uppermost position of the yoke 26 forms a magnetic path that extends from the permanent magnet 19 (north pole) and that successively passes through the yoke 26, the bearing mounting part 20, the second bearing 24, the first rod 4 and the core 7 to reach the permanent magnet 19 (south pole). In the linear motor, either or both of the bearing mounting part 20 and the second bearing 24 are made of a non-magnetic material. Accordingly, it is possible to break a magnetic circuit formed by the magnetic flux exiting from the permanent magnet 19 disposed at the uppermost position of the yoke 26. Therefore, even if iron powder adheres to the sliding surface (outer peripheral surface) of the first rod 4, the iron powder can be removed easily by the scraping action of the seal member 25.

The following is an explanation of the routing of the wires 12 in the first embodiment. As shown in FIG. 1, the wires 12 are extended from the inner periphery of the upper end of the armature 5. In a state where the armature 5 is installed around the outer periphery of the first rod 4, that is, in a state where an upper end surface 5*a* of the armature 5 abuts on the stepped portion 10 of the first rod 4, the wiring holes 11 of the first rod 4 open to face the inner periphery of the upper end of the armature 5. Thus, the wires 12 extending from the armature 5 are directly guided into the space 15 in the first rod 4 by passing obliquely upward through the wiring holes 11 of the first rod 4.

In a case where the outer diameter $d5$ of the second rod 23 is smaller than the inner diameter $d4$ of the small-diameter portion 9 ($d4>d5$), the wires 12 guided into the space 15 in the first rod 4 are passed through a space between the inner periphery of the first rod 4 and the second rod 23, i.e. through a gap 27 formed between the inner diameter $d2$ of the large-diameter portion 8 and the outer diameter $d5$ of the second rod 23. That is, the gap 27 has a space of $d2-d5$ in the radial direction (horizontal direction in FIG. 1). The wires 12 passed through the gap 27 are properly handled at the upper end of the space 15 in the first rod 4 (in FIG. 1, the wires 12 are cranked) before being passed through the wiring passage 14 and extended to the outside of the stator 2 from an upper end opening of the mounting shaft 13.

The upper end surface 5*a* of the armature 5 is provided thereon with a stack of an annular first stopper 28 and an annular second stopper 29. The second stopper 29 is provided on the upper end surface of the first stopper 28. The first stopper 28 is fastened to the first rod 4 by using a thread provided on the outer periphery of the small-diameter portion 9, for example. The second stopper 29 is made of elastic nylon, polyurethane, rubber or the like. With this structure, when the electromagnetic suspension system 1 extends to the full length of the first rod 4, the second stopper 29 abuts against the bearing mounting part 20, and the impact of the second stopper 29 (force input to the bearing mounting part 20) is transmitted to the first rod 4 through the first stopper 28. As a result, the impact is blocked from acting on the armature 5 and the wires 12, and thus the armature 5 and the wires 12 can be protected.

In addition, a cylindrical protecting member 30 is provided along the inner periphery of the upper end (one end) portion of the first rod 4, i.e. along the inner periphery of the large-diameter portion 8 (where the inner diameter is $d2$). The protecting member 30 is made of an insulating material. The wires 12 extending from the armature 5 and passing through the wiring holes 11 are routed through the space between the protecting member 30 and the inner peripheral surface of the large-diameter portion 8. With this structure, even if the wires 12 bend during the compression stroke of the electromagnetic suspension system 1, contact between the wires 12 and the second rod 23 is avoided. Thus, the wires 12 can be protected.

In the first embodiment, the wires 12 extending from the armature 5 are routed through the gap 27 between the inner periphery of the first rod 4 and the outer periphery of the second rod 23. Therefore, the wires 12 are not exposed to the outside. Thus, the wires 12 can be protected from the external environment. Accordingly, it is possible to ensure reliability for the electric system of the electromagnetic suspension system 1. Further, the wires 12 extending from the armature 5 are passed through the wiring passage 14 and projected from the distal end of the first rod 4 (from the upper end surface of the mounting shaft 13). Therefore, it is easy to relay and route the wires 12 when the linear motor is installed to the vehicle and hence possible to improve operability.

Further, when the electromagnetic suspension system 1 extends to the full length of the first rod 4, the second stopper 29 abuts against the bearing mounting part 20, and the impact of the second stopper 29 is transmitted to the first rod 4 through the first stopper 28. As a result, the impact is blocked from acting on the armature 5 and the wires 12, and thus the armature 5 and the wires 12 can be protected. On the other hand, during the compression stroke of the electromagnetic suspension system 1, even if the wires 12 bend, contact between the wires 12 and the second rod 23 is avoided. Accordingly, the wires 12 can be protected. Further, contact between the wires 12 and the second rod 23 can be structurally avoided by protecting the wires 12 with the protecting member 30. Therefore, it is possible to improve the reliability of the electric system of the electromagnetic suspension system 1.

In addition, the coils 6 are disposed around the outer periphery of the stator 2, and the permanent magnets 19 are disposed along the inner periphery of the mover 3. Therefore, the air gap between the stator 2, which provides a thrust generating surface, and the mover 3 is shifted outward in the radial direction of the linear motor as compared to the publicly known linear motor in which coils are disposed along inner periphery of the stator, and permanent magnets are disposed around the outer periphery of mover. Accordingly, the opposing area between the armature 5 and the permanent magnets 19 increases. Consequently, the thrust of the linear motor increases, and it is possible to improve the vibration damping performance of the electromagnetic suspension system 1 and the ride quality of the vehicle. When compared for the same capacity (for the same thrust available), the linear motor can be reduced in size.

In addition, the inner diameter d4 of the lower end (other end) portion of the first rod 4, i.e. the inner diameter d4 of the small-diameter portion 9, is smaller than the inner diameter d2 of the upper end (one end) portion of the first rod 4, i.e. the inner diameter d2 of the large-diameter portion 8 (d2>d4). Therefore, the center radius of the coils 6 is reduced, and the build of the armature 5 can be increased, as compared to the above-described publicly known linear motor. Consequently, the number of turns of the coils 6 can be increased, and the performance of the linear motor can be improved. For the same number of turns of the coils 6, the winding length of the coils 6 can be reduced. Therefore, it is possible to increase the power-generation constant (Ke) and to reduce the resistance (R). Thus, a high damping coefficient ($Ke^2/R$) can be obtained.

As has been stated above, the electromagnetic suspension system 1 according to the first embodiment employs a linear motor in which the coils 6 are disposed around the outer periphery of the stator 2, and the permanent magnets 19 are disposed along the inner periphery of the mover 3. With this structure, it is possible to improve the vibration damping performance of the electromagnetic suspension system 1 and the ride quality of the vehicle. In addition, the wires 12 are routed through the gap 27 between the first rod 4 and the second rod 23. This structure makes it possible to ensure reliability for the electric system of the electromagnetic suspension system 1.

Next, a second embodiment of the present invention will be explained with reference to FIGS. 3 and 5. It should be noted that an electromagnetic suspension system 31 of the second embodiment has the same basic structure as the electromagnetic suspension system 1 of the foregoing first embodiment. That is, the electromagnetic suspension system 31 employs a linear motor in which the coils 6 are disposed around the outer periphery of the stator 2, and the permanent magnets 19 are disposed along the inner periphery of the mover 3. Therefore, in the following explanation, constituent elements in the second embodiment which are the same as or correspond to those in the first embodiment are given the same names and reference numerals as those in the first embodiment, and redundant explanation is omitted for the sake of simplifying the description of the specification.

Figure 3:
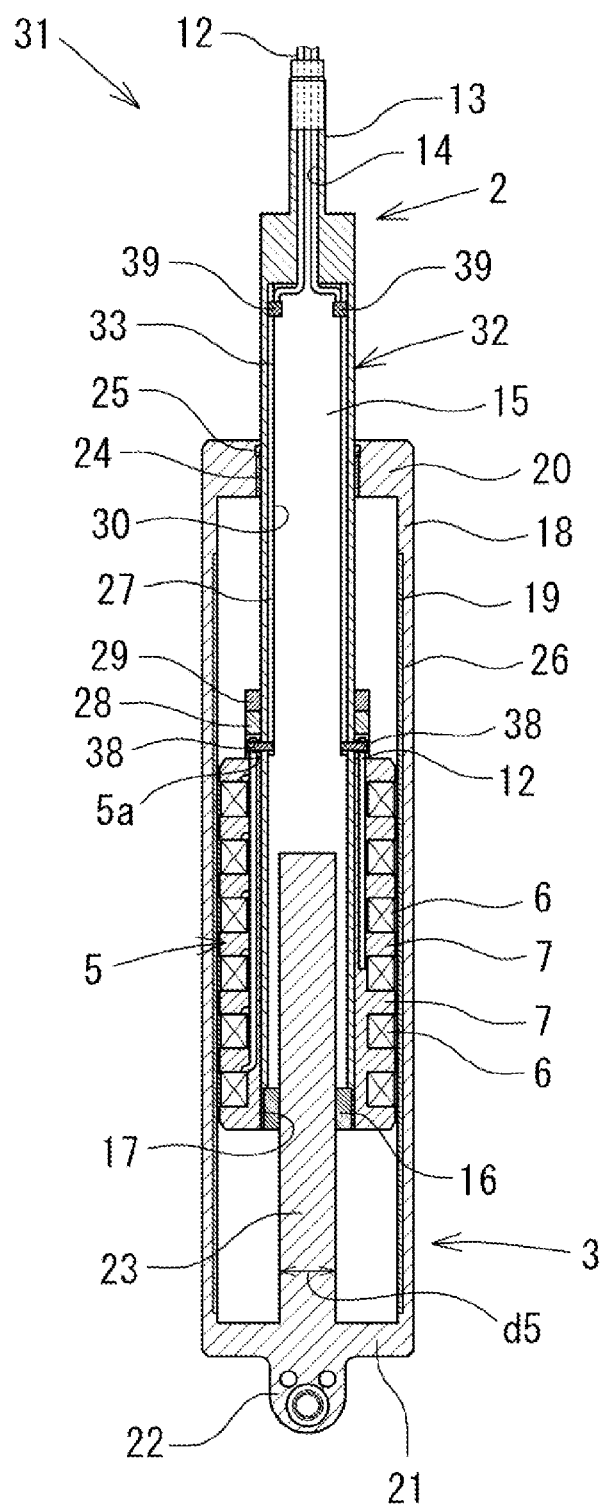
FIG. 3 is an axial sectional view showing an overall structure of a cylindrical linear motor used in an electromagnetic suspension system according to a second embodiment of the present invention.
Figure 4:
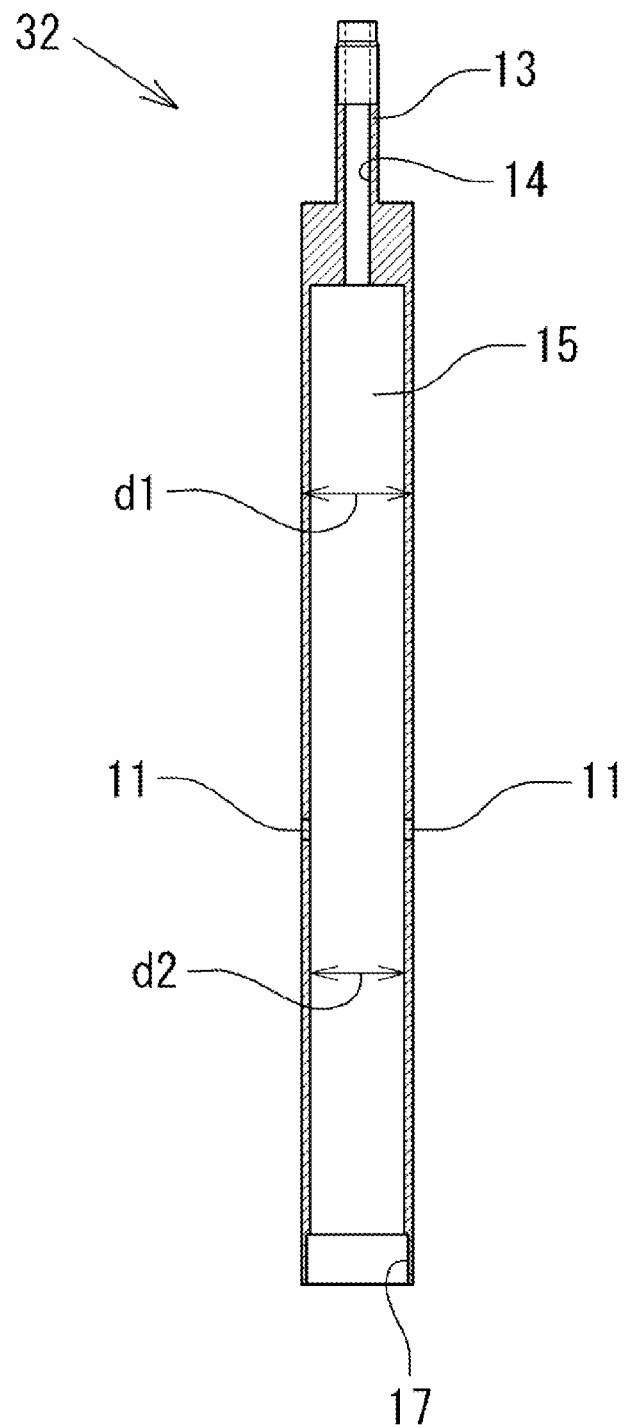
FIG. 4 is an axial sectional view of a first rod used in the linear motor shown in FIG. 3.

As shown in FIG. 3, a stator 2 has a cylindrical first rod 32. As will be understood by referring to FIGS. 2 and 4, the first rod 32 differs from the first rod 4 of the linear motor according to the first embodiment (hereinafter referred to as simply "first rod 4") in that the first rod 4 has the stepped portion 10, whereas the first rod 32 does not have any stepped portion 10. That is, the first rod 32 has no small-diameter portion 9. The first rod 32 has an outer diameter of d1 and an inner diameter of d2. The first rod 32 is provided with at least one wiring hole 11 extending through the first rod 32 in the radial direction (horizontal direction in FIG. 4) at a position facing wires 12 extending from an armature 5 attached to a lower end (other end) portion of the first rod 32. It should be noted that, in the second embodiment, three wiring holes 11 are disposed annularly in correspondence to U-, V- and W-phases of the armature 5.

In the linear motor shown in FIG. 3, a cylindrical wiring member 33 is attached to an inner peripheral portion of the first rod 32 corresponding to the gap 27 in the first rod 4, i.e. an upper end (one end) portion of the space 15 in the first rod 32. In other words, the wiring member 33 is attached to the inner periphery of the first rod 32 at a position upper than the wiring holes 11. As shown in FIG. 5, the wiring member 33 has axial electrically conducting portions 34 and axial insulating portions 35 extending in the axial direction (vertical direction in FIGS. 3 and 5) and alternating with each other in the circumferential direction. It should be noted that the wiring member 33 shown in FIG. 5 has three axial electrically conducting portions 34 formed by bus bars in correspondence to the U-, V- and W-phases of the armature 5. The outer periphery of the wiring member 33 is formed by an outer peripheral insulating portion 36.

Figure 5:
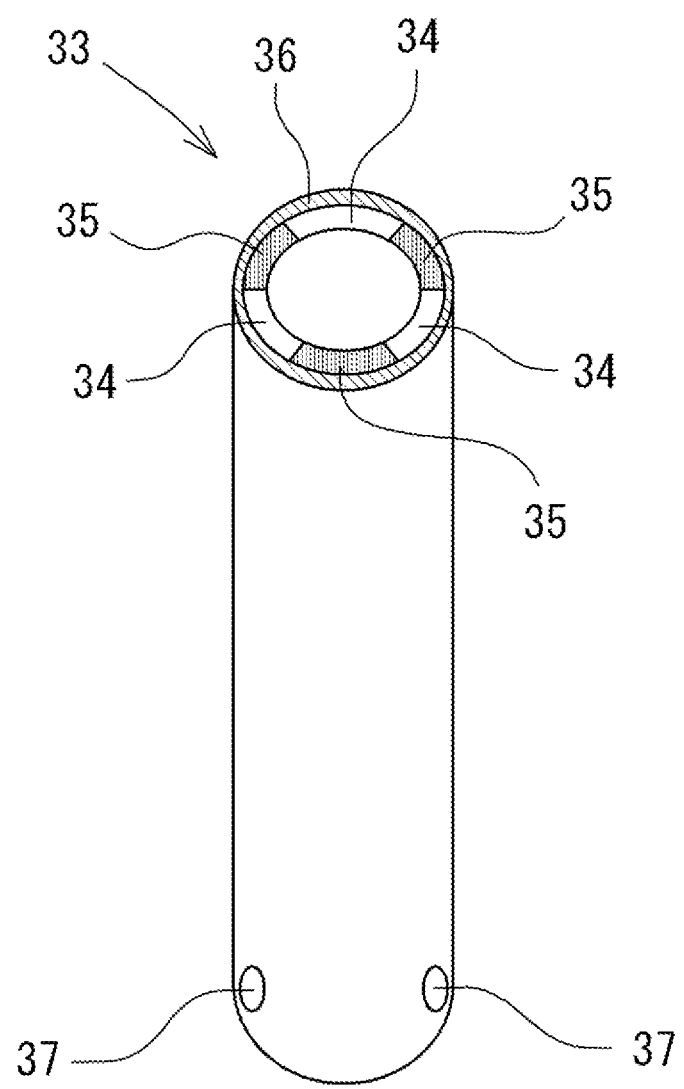
FIG. 5 is a perspective view of a wiring member used in the linear motor shown in FIG. 3.

In addition, as shown in FIG. 5, the lower end portion of the wiring member 33 is provided with three connecting holes 37 corresponding to the axial electrically conducting portions 34, respectively. It should be noted that, in the second embodiment, each connecting hole 37 extends through the outer peripheral insulating portion 36 and the corresponding axial electrically conducting portion 34. In this regard, however, only the outer peripheral insulating portion 36 may be partly removed in a circular shape to expose each axial electrically conducting portion 34, for example. Each connecting hole 37 may comprises a hole extending through the outer peripheral insulating portion 36 and a hole extending through the corresponding axial electrically conducting portion 34, the two holes being different in hole diameter from each other. The number of connecting holes 37 provided in the wiring member 33 may be not less than the number of axial electrically conducting portions 34. Namely, the number of connecting holes 37 provided in the wiring member 33 may be the same as or more than the number of axial electrically conducting portions 34. The number of wiring holes 11 provided in the first rod 32 may be not less than the number of connecting holes 37. Namely, the number of wiring holes 11 provided in the first rod 32 may be the same as or more than the number of connecting holes 37.

Securing the wiring member 33 to the first rod 32 may be effected by properly selecting a joining method, e.g. press fitting, bonding, or thread fastening. The wires 12 of the armature 5 are connected to the connecting holes 37 (axial electrically conducting portions 34) of the wiring member 33 by connecting members 38, respectively, made of an electrical conductor. The connecting members 38 may be screws, or springs, for example. One end of each wire 12 is connected to a vehicle body-side member. The other end of each wire 12 is connected to the upper end (corresponding axial electrically conducting portion 34) of the wiring member 33 by a wire-connecting member 39 in the same way as the connection between each wire 12 of the armature 5 and the corresponding connecting hole 37 of the wiring member 33.

The electromagnetic suspension system 31 according to the second embodiment provides advantageous effects equivalent to those offered by the electromagnetic suspension system 1 according to the foregoing first embodiment. In the second embodiment, the wires 12 extending from the armature 5 and the wires 12 extending to the outside of the first rod 32 are connected to each other by the wiring member 33. Accordingly, the space for the wires 12 can be reduced, and handling of the wires 12 can be facilitated. Thus, the efficiency of assembling operation can be increased. In addition, because the axial electrically conducting portions 34 of the wiring member 33 are formed by bus bars, the wiring resistance can be reduced in comparison to lead wires or the like. Consequently, unwanted heat generation can be prevented, and energy loss can be reduced.

According to the foregoing embodiments, it is possible to provide an electromagnetic suspension system improved in reliability of wiring of a cylindrical linear motor.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2011-165613 filed on Jul. 28, 2011.

The entire disclosure of Japanese Patent Application No. 2011-165613 filed on Jul. 28, 2011 including specification, claims, drawings and summary is incorporated herein by reference in its entirety.

What is claimed is:

1. An electromagnetic suspension system with a linear motor, comprising:

an outer tube in a shape of a cylinder, one end of which is closed, the outer tube having a magnet at an inner periphery thereof;

a hollow first rod movably inserted in the outer tube, one end of the first rod extending out of the outer tube, the first rod having an armature around an outer periphery of an other end thereof; and a second rod having one end slidably fitted to an inner periphery of the first rod, an other end of the second rod being secured to a bottom of the outer tube;

wherein a gap is defined between an inner periphery of the one end of the first rod and an outer periphery of the second rod, wiring is disposed in the gap, a one end of the wiring is connected to the armature, and an opposite end of the wiring extends to an outside of the first rod.

2. The electromagnetic suspension system of claim 1, wherein the wiring includes a bus bar.

3. The electromagnetic suspension system of claim 2, wherein the inner periphery of the first rod has an inner diameter at the one end thereof and an inner diameter at the other end thereof, and the inner diameter at the one end of the first rod is larger than the inner diameter at the other end of the first rod.

4. The electromagnetic suspension system of claim 2, wherein a protecting member is disposed at the inner periphery of the first rod, the wiring is disposed between an inner peripheral surface of the first rod and the protecting member such that the wiring is protected from the second rod.

5. The electromagnetic suspension system of claim 1, wherein the inner periphery of the first rod has an inner diameter at the one end thereof and an inner diameter at the other end thereof, and the inner diameter at the one end of the first rod is larger than the inner diameter at the other end of the first rod.

6. The electromagnetic suspension system of claim 5, wherein a protecting member is disposed at the inner periphery of the first rod, the wiring is disposed between an inner peripheral surface of the first rod and the protecting member such that the wiring is protected from the second rod.

7. The electromagnetic suspension system of claim 1, wherein a protecting member is disposed at the inner periphery of the first rod, the wiring is disposed between an inner peripheral surface of the first rod and the protecting member such that the wiring is protected from the second rod.

8. The electromagnetic suspension system of claim 1, wherein the first rod has a large-diameter portion forming the one end of the first rod, and a small-diameter portion forming the other end of the first rod;

the first rod further has a stepped portion formed at a boundary between the large-diameter portion and the small-diameter portion, the first rod is provided with a wiring hole which extends obliquely through the stepped portion; and the wiring of the armature extends through the wiring hole from an outer periphery of the small-diameter portion to an inner periphery of the large-diameter portion.

9. The electromagnetic suspension system of claim 1, wherein a cylindrical wiring member is attached to one end of a space in the first rod, and a section of the wiring extending from the armature and a section of the wiring extending to the outside of the first rod are connected by the wiring member.

10. The electromagnetic suspension system of claim 9, wherein the wiring member has an axial electrically conducting portion and an axial insulating portion which extend in an axial direction and which alternate with each other in a circumferential direction; and the wiring member has an outer peripheral insulating portion around an outer periphery thereof.

* * * * *